United States Patent
Zou

(10) Patent No.: US 7,848,653 B2
(45) Date of Patent: *Dec. 7, 2010

(54) METHOD AND DEVICE FOR TRANSMITTING LOW RATE SIGNALS OVER AN OPTICAL TRANSPORT NETWORK

(75) Inventor: Shimin Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 612 days.

This patent is subject to a terminal disclaimer.

(21) Appl. No.: 11/760,418

(22) Filed: Jun. 8, 2007

(65) Prior Publication Data

US 2007/0248121 A1    Oct. 25, 2007

Related U.S. Application Data

(63) Continuation of application No. PCT/CN2005/002185, filed on Dec. 14, 2005.

(30) Foreign Application Priority Data

Dec. 14, 2004   (CN) .................. 2004 1 0103303

(51) Int. Cl.
*H04J 14/00* (2006.01)
(52) U.S. Cl. .................. 398/72; 398/67; 398/75; 398/58
(58) Field of Classification Search .......... 398/98, 398/58, 66–68, 70–72; 370/474, 466, 535, 370/537, 538, 498, 476
See application file for complete search history.

(56) References Cited

U.S. PATENT DOCUMENTS 5,189,673 A    2/1993    Burton et al.

(Continued)

FOREIGN PATENT DOCUMENTS

CN          1237051 A          12/1999

(Continued)

OTHER PUBLICATIONS

Dehua, "Digital Wrapper Technology and Its Application in Optical Transport Network," *Telecom Science*, 6:43-44 (2003).

(Continued)

*Primary Examiner*—Dalzid Singh
(74) *Attorney, Agent, or Firm*—Leydig, Voit & Mayer, Ltd.

(57) ABSTRACT

Embodiments of the present invention provide a method for transmitting low rate signals over an optical transport network, including: adapting the low rate signals into low rate optical channel data units of the same rate level with the low rate signals; asynchronously mapping each of the low rate optical channel data units into a low rate optical channel data tributary unit respectively, and generating justification overhead used for rate adaptation for each of the low rate optical channel data units; and forming a higher order optical channel data unit with at least one low rate optical channel data tributary unit and justification overhead corresponding to the low rate optical channel data tributary unit. The present invention enables the optical transport network to support mapping, multiplexing and highly efficient transmission of low rate signals.

16 Claims, 4 Drawing Sheets

U.S. PATENT DOCUMENTS

| | | | |
|---|---|---|---|
| 5,687,014 | A | 11/1997 | Czerwiec et al. |
| 5,841,760 | A | 11/1998 | Martin et al. |
| 6,539,031 | B1 | 3/2003 | Ngoc et al. |
| 6,674,771 | B1 | 1/2004 | Taniguchi |
| 6,744,789 | B1 | 6/2004 | Michener |
| 6,907,048 | B1 | 6/2005 | Treadaway et al. |
| 7,058,090 | B1 | 6/2006 | Player et al. |
| 7,245,633 | B1 * | 7/2007 | Mueller ............ 370/466 |
| 2002/0051284 | A1 | 5/2002 | Takatsu et al. |
| 2003/0048813 | A1 * | 3/2003 | Lahav et al. ........ 370/537 |
| 2004/0131090 | A1 | 7/2004 | Clauberg |
| 2006/0104309 | A1 * | 5/2006 | Vissers et al. ...... 370/474 |
| 2007/0076769 | A1 | 4/2007 | Zou ................ 370/539 |
| 2007/0189336 | A1 | 8/2007 | Zou ................ 370/505 |

FOREIGN PATENT DOCUMENTS

| | | | |
|---|---|---|---|
| CN | 1250989 | A | 4/2000 |
| CN | 1267164 | A | 9/2000 |
| CN | 1392684 | A | 1/2003 |
| CN | 1104789 | C | 4/2003 |
| CN | 1433192 | A | 7/2003 |
| CN | 100596043 | C | 3/2010 |
| EP | 0939509 | A2 | 9/1999 |
| EP | 1043856 | A2 | 10/2000 |
| EP | 1330077 | A1 | 7/2003 |
| EP | 1 657 839 | | 5/2006 |
| WO | WO-02/063834 | | 8/2002 |
| WO | WO 2006/015549 | | 2/2006 |
| WO | WO 2006/021157 | | 3/2006 |

OTHER PUBLICATIONS

Gou-hui et al., "The Mapping and Mulplexing of Client Signals in OTN," *Study of Optical Communications*, 117:8-11 (2003).

International Preliminary Report on Patentability for International Application No. PCT/CN2005/002185, dated Jun. 19, 2007.

International Search Report for International Application No. PCT/CN2005/002185, dated Mar. 2, 2006.

Written Opinion for International Application No. PCT/CN2005/002185, dated Mar. 2, 2006.

State Intellectual Property Office of the People's Republic of China, English Translation of Written Opinion of the International Searching Authority in International Patent Application No. PCT/CN2005/001329 (Dec. 1, 2005).

Zhang et al., "All Optical Packet Switching in the Next Generation Metropolitan Networks," Guangdong Communication Technology, vol. 22, No. 4 (Apr. 22, 2002).

"Interfaces for the Optical Transport Network (OTN): G.709/Y.1331 (Mar. 2003)," ITU-T Standard in Force (1), International Telecommunication Union (2003).

European Office Action for Application No. 05818717, dated Oct. 23, 2009.

Supplementary European Search Report for Application No. 05818717, dated Jun. 4, 2008.

* cited by examiner

| Column Row | 1 ... 7 | 8 ... 14 | 15 | 16 | 17 ... 3824 | 3825 ... 4080 |
|---|---|---|---|---|---|---|
| 1 | FAS | OTU OH | | | | FEC |
| 2 | ODU OH | | OPU OH | | OPU | |
| 3 | | | | | | |
| 4 | | | | | | |

Figure 1 (Prior Art)

| | 1 ... 6 | 7 | 8 9 10 | 11 12 13 | 14 15 |
|---|---|---|---|---|---|
| 1 | FAS | MFAS | | | |

| Column Row | 1 ... 7 | 8 ... 14 | 15 | 16 | 17 ... 3824 |
|---|---|---|---|---|---|
| 1 | FAS | | OPU0 OH | | |
| 2 | ODU0 OH | | | | OPU0 |
| 3 | | | | | |
| 4 | | | | PSI | |

| Row | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 2 | RES | | | TCMACT | TCM6 | | TCM5 | | TCM4 | | | FTFL | | |
| 3 | TCM3 | | | TCM2 | | | TCM1 | | | PM | | | EXP | |
| 4 | GCC1 | | | GCC2 | | | APS/PCC | | RES | | | | | |

FIGURE 2

METHOD AND DEVICE FOR TRANSMITTING LOW RATE SIGNALS OVER AN OPTICAL TRANSPORT NETWORK

CROSS-REFERENCE TO RELATED APPLICATIONS

This is a continuation of International Application No. PCT/CN2005/002185, filed Dec. 14, 2005, which claims the benefit of Chinese Patent Application No. CN 200410103303.2, filed Dec. 14, 2004, the entire disclosure of which is incorporated herein by reference.

BACKGROUND OF THE INVENTION

1. Field of the Technology

The present invention relates to data transmission technologies in an Optical Transport Network (OTN), and particularly, to a method and a device for transmitting low rate signals over the OTN.

2. Background of the Technology

Aiming at the rapid development of OTN, the International Telecommunication Union—Telecommunication Standardization Sector (ITU-T) has issued OTN series recommendations ITU-T G.709, G.798 and G.87X, and OTN products are coming into commercial use. Among the recommendations, G.709, put forward in February 2001, is of particular significance and has laid the technical foundation of optical internetworking. The core of G.709 recommendation is a digital wrapper technology, in which a special frame format is provided to encapsulate client signals into the payload unit of a frame and provide overhead (OH) used for Operation, Administration, Maintenance and Provision (OAM&P) in the head of the frame and Forward Error Correction (FEC) bytes at the end of the frame.

The standard frame format adopted by digital wrapper is as shown in FIG. 1. It can be seen that the standard frame in a digital wrapper technology adopts a frame format of 4 rows× 4080 columns. The 16 columns in the head of a frame are OH bytes, the 256 columns at the end of frame are FEC check bytes, and the 3808 columns in the middle are payload. In the OH bytes in the head of the frame, the first 7 columns in the $1^{st}$ row are Frame Alignment Signal (FAS); the $8^{th}$ to $14^{th}$ columns are level k Optical channel Transport Unit (OTUk) OH bytes, and different values of k correspond to different transmission modes of different rates; the first 14 columns in the $2^{nd}$ to $4^{th}$ rows are level k Optical channel Data Unit (ODUk) OH bytes, the $15^{th}$ column and $16^{th}$ columns are Optical channel Payload Unit (OPUk) OH bytes, in which k=1, or 2, or 3. The $7^{th}$ byte in the FAS is a Multi-Frame Alignment Signal (MFAS) used for indicating the OH allocation when multiple client signals are carried in a TDM mode.

OTUk OH bytes provide monitoring functions for the status of signals transmitted between the 3R (Reamplification, Reshaping, and Retiming) regeneration points in the OTN, including three portions: the overhead bytes for Section Monitoring (SM), the overhead bytes for inter-terminal General Communication Channel 0 (GCC0), and Reserved (RES) bytes.

ODUk OH provides tandem connection monitoring, end-to-end path supervision and adaptation of client signals, as well as plenty of overhead bytes (columns 1 to 14 of rows 2-4) to achieve the above functions, including bytes for Path Monitoring (PM) OH, Tandem Connection Monitoring (TCM) OH, GCC 1 (General Communication Channel 1) OH and GCC 2 OH, Automatic Protection Switching/Protection Communication Channel (APS/PCC) OH, Fault Type and Fault Location (FTFL) message, and Experimental OH (EXP).

An OPUk consists of payload into which client signals are mapped, and related OH including a Payload Structure Identifier (PSI), justification bytes and Mapping Specific Overhead; the value of the PSI ranges from 0 to 255 according to the indication of an MFAS, and the PSI[0] indicates the Payload Type (PT) of a client signal and the rest bytes are reserved bytes (RES) for future extension.

An OTN is a major technology for the lower layer transmission in a future network, and the key to the optimized application of the OTN includes signals of various rate levels over the OTN and corresponding carrying and mapping technologies. High rate signals may directly be mapped into signals of corresponding rate levels for transmission by adopting an ODJk/OPUk/OTUk provided by the digital wrapper technology, and the signal uplink/downlink and signal management can thus be performed. With respect to low rate signals, since direct rate adaptation is impossible, further plans shall be sought to map and multiplex the low rate signals into the ODUk/OPUk/OTUk of various rate levels as well as to solve the problems in transmission efficiency, transmission performance, equipment complexity, operation cost, etc.

At present, there are the three following methods for mapping client signals into the OTN.

(1) Mapping signals of CBR (Constant Bit Rate) 2G5, CBR10G, and CBR40G into an OPUk: constant bit rate signals of CBR2G5—2488320 kbit/s±20 ppm, e.g. STM-16; constant bit rate signals of CBR10G—9953280 kbit/s±20 ppm, e.g. STM-64; constant bit rate signals of CBR40G—39813120 kbit/s±20 ppm, e.g. STM-256. The mapping may be performed according to two different modes (asynchronous and bit synchronous). In the asynchronous mode, a local clock is not associated with client signals and a positive/negative/zero justification scheme is used. In the bit synchronous mode, the clock derived from client signals is used.

(2) Mapping Asynchronous Transfer Mode (ATM) signals into an OPUk: a constant bit rate ATM cell stream with a capacity that is identical to the OPUk payload area is created by multiplexing ATM cells so as to be mapped into the OPUk, wherein the rate is adapted by either inserting idle cells or discarding cells during the multiplexing. The ATM cell information field should be scrambled before mapping.

(3) Mapping of GFP (General Framing Procedure) frames into an OPUk: mapping GFP frames into a continuous bit stream matching the OPUk by inserting idle frames at the GFP encapsulation stage, and scrambling is also performed during the encapsulation. Other signals may be mapped into the OPUk as well, such as client signals, test signals, and common client bit stream signals.

According to the OTN recommendation at the present, a data signals solution is achieved by adapting data units to an OPTED by means of a GFP, which is suitable to high rate signals; but with respect to low rate signals, e.g., CBR155/CBR622 signals in Gigabyte Ethernet (GE) signals, Fiber Connection (FC) signals and Metropolitan Area Network (MAN), the solution brings many problems to the transmission of low rate signals over the OTN, including low bandwidth utilization, low transmission efficiency, poor performance in transparent uplink and downlink transmission and end-to-end management, difficulties in line maintenance, complicated devices, large volume of calculation, high cost, etc.

Since the smallest dispatching granularity of an OTN is level 2.5G (for different k, the rate is: 2.5G when k=1, 10G when k=2, and 40G when k=3); in the prior art low rate signals such as GE signals are adapted to an OPU1 and then dispatched by an ODU1, which results in unmatched rate and bandwidth resource waste. When two GE signals are adapted to Synchronous Digital Hierarchy (SDH) VC-7V virtual concatenation via a GFP, multiplexed into STM-16 signal, and mapped into an OPUk/OTN, the dispatch function of an ODUk on an OTN can not act on GE signals and an extra virtual concatenation process on the SDN layer will be added; when two GE signals are adapted to a part of an ODU1, the performance monitor function of the ODU1 cannot recognize the error performance of a single GE signal. Such practice makes it impossible to implement transparent uplink and downlink transmission and end-to-end management for individual low rate signals and the system complexity will also be greatly increased.

A variety of low rate signals, e.g., GE and FC signals as a type of client signals, will continue to exist in backbone networks and MANs for a long time, especially in backbone networks. An OTN transmission technology is one of the key technologies for lower layer transmission in the future, and therefore it is urgent to find a way to enable the transparent transmission of GE level low rate signals over the OTN, end-to-end management of low rate signals and flexible signals uplink and downlink at intermediate nodes.

SUMMARY OF THE INVENTION

Embodiments of the present invention provide a method and a device for transmitting low rate signals over an optical transport network, which will enable the optical transport network to support mapping, multiplexing and highly efficient transmission of low rate signals.

A method for transmitting low rate signals over an optical transport network includes:

adapting low rate signals into low rate optical channel data units of the same rate level with the low rate signals;

asynchronously mapping each of the low rate optical channel data units into a low rate optical channel data tributary unit respectively, and generating justification overhead used for rate adaptation for each of the low rate optical channel data units; and forming a higher order optical channel data unit with at least one low rate optical channel data tributary unit and justification overhead corresponding to the at least one low rate optical channel data tributary unit.

The forming the higher order optical channel data unit includes:

dividing the payload area of a higher order optical channel payload unit into at least one time slot channel, and mapping the at least one low rate optical channel data tributary unit into the at least one time slot channel; and mapping the justification overhead of each of the at least one low rate optical channel data tributary unit respectively into the overhead area of the higher order optical channel payload unit according to a Multi-Frame Alignment Signal (MFAS).

The dividing the payload area of the higher order optical channel payload unit into the at least one time slot channel includes:

dividing the payload area of the higher order optical channel payload unit according to the size of the minimum low rate optical channel data tributary unit that can be transmitted by the payload area of the higher order optical channel payload unit, and the number of the time slot channels equals the maximum number of minimum low rate optical channel data tributary units that can be transmitted by the payload area of the higher order optical channel payload unit.

The method further includes:

filling justification control bytes and negative justification opportunity bytes of the justification overhead in the overhead area of the higher order optical channel payload unit, and the location of the justification overhead corresponds to a present value of the MFAS.

The method further includes:

filling positive justification opportunity bytes in the time slot channel corresponding to the low rate optical channel data tributary unit.

The method further includes:

filling a frame alignment signal in the overhead area of the low rate optical channel data unit.

The method further includes:

filling a Payload Structure Identifier (PSI) in the overhead area of the higher order optical channel payload unit for indicating the type and the tributary port number of the low rate optical channel data tributary unit carried by the time slot channel corresponding to a present MFAS value.

The method further includes:

filling fixed stuff bytes in the rate optical channel data tributary unit to adjust the rate of the low rate optical channel data unit, and mapping each byte in the low rate optical channel data unit into an information byte in the low rate optical channel data tributary unit.

The method further includes:

filling an alarm indication signal in the low rate optical channel data tributary unit in the case that the low rate signals to be transmitted fail.

The low rate signals includes at least one of Gigabyte Ethernet (GE) signals, Fiber Connection (FC) signals, CBR 155M signals, and CBR 622M signals; and the higher order optical channel data unit includes one of an optical channel data unit of level 1, an optical channel data unit of level 2, and an optical channel data unit of level 3.

When the low rate signals comprise GE or FC signals, corresponding low rate optical channel data unit includes an optical channel data unit of level 0;

when the low rate signals include CBR 155M signals, corresponding low rate optical channel data unit includes an optical channel data unit of type 155; and when the low rate signals comprise CBR 622M signals, corresponding low rate optical channel data unit includes an optical channel data unit of type 622.

The higher order optical channel payload unit includes one of an optical channel payload unit of level 1, an optical channel payload unit of level 2, and an optical channel payload unit of level 3; and the payload area rate of the higher order optical channel payload unit is greater than or equals the double of the rate of the low rate optical channel data tributary unit.

The low rate optical channel data unit includes a payload area used for carrying the low rate signals, and an overhead area used for monitoring, managing and maintaining the low rate signals.

The method further includes:

parsing the higher order optical channel data unit to obtain the at least one low rate optical channel tributary unit and the corresponding justification overhead;

parsing the at least one low rate optical channel tributary unit to obtain the low rate optical channel data units according to the corresponding justification overhead; and retrieving the low rate signals from the low rate optical channel data units.

A device for transmitting low rate signals over an optical transport network includes:

a first unit, for adapting low rate signals into low rate optical channel data units of the same rate level with the low rate signals;

a second unit, for asynchronously mapping each of the low rate optical channel data units into a low rate optical channel data tributary unit respectively, and generating justification overhead used for rate adaptation for each of the low rate optical channel data units;

a third unit, for forming a higher order optical channel data unit with at least one low rate optical channel data tributary unit and justification overhead corresponding to the at least one low rate optical channel data tributary unit.

The third unit includes:

a first sub-unit, for dividing the payload area of a higher order optical channel payload unit into at least one time slot channel, and mapping the at least one low rate optical channel data tributary unit into the at least one time slot channel; and a second sub-unit, for mapping the justification overhead of each of the at least one low rate optical channel data tributary unit respectively into the overhead area of the higher order optical channel payload unit according to a Multi-Frame Alignment Signal (MFAS).

The first unit is further used for parsing the higher order optical channel data unit to obtain the at least one low rate optical channel tributary unit and the corresponding justification overhead; and the second unit is further used for parsing the at least one low rate optical channel tributary unit to obtain the low rate optical channel data units according to the corresponding justification overhead; and the third unit is further used for retrieving the low rate signals from the low rate optical channel data units.

Through comparison it can be seen that the major differences between the technical scheme in accordance with the embodiments of the present invention and the technical scheme in the prior art lie in that: the embodiments of the present invention provides an optical channel data unit frame format which is adapted to low rate signals and offers end-to-end management and transparent uplink and downlink transmission, provides corresponding bearer rate and overhead area structure, and puts forward the structures of the optical channel tributary data unit, unit group and justification overhead from the low rate signals optical channel data unit to the higher order optical channel data unit; the payload area of the higher order optical channel payload unit is divided into multiple time slot channels used for carrying low rate optical channel tributary data units in a byte interleaving mode; the justification overhead of the optical channel tributary data units are allocated by means of MFAS; and the bearer for information related to the signals carried by time slot channels is set up; through the operations above the present invention maps multiple low rate optical channel data units into the payload of higher order optical channel data units and thus solves the problem of high-efficient transmission of low rate signals over the OTN.

The new features in the technical scheme in accordance with the embodiments of the present invention bring significant advantages: end-to-end performance monitoring and management and transparent uplink and downlink transmission of individual low rate signals are achieved by enabling dedicated optical channel data units which are adapted to low rate signals, to carry low rate signals and by multiplexing the low rate signals into higher order optical channel data units for further transmission, therefore the network protection and OAM&P capability of low rate signals are enhanced accordingly, and transmission efficiency and bandwidth utility rate increase remarkably; the simple mapping and multiplexing scheme reduce system complexity and simplify operations between layers, which leads to low cost and slight delay; and multi-frame multiplexing mechanism achieves hybrid multiplexing and transmission of signals of different types. To sum up, the technical scheme of the present invention improves the transmission performance of low rate signals over the OTN.

BRIEF DESCRIPTION OF THE DRAWINGS

FIG. 1 is a schematic diagram illustrating the standard frame format of digital wrapper.

FIG. 2 is a schematic diagram illustrating the ODU0 frame format in accordance with an embodiment of the present invention.

DETAILED DESCRIPTION OF THE PREFERRED EMBODIMENTS

Figure 3:
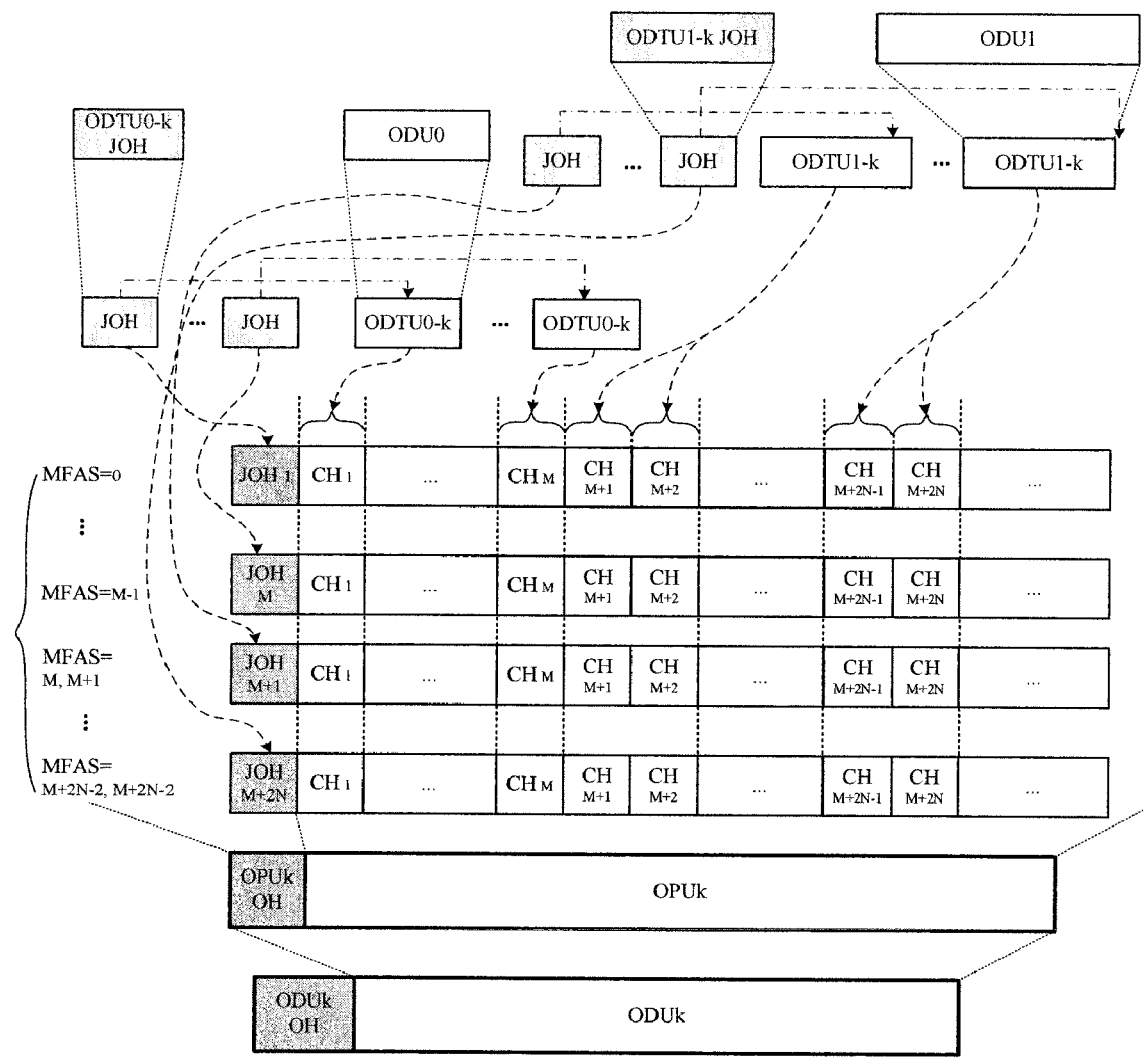
FIG. 3 is a schematic diagram illustrating the process of multiplexing varieties of low rate ODU into higher order ODUk/OPUk in accordance with an embodiment of the present invention.

Embodiments of the present invention provide a mapping method based on ITU-T G.709 recommendation for varieties of low rate signals including GE, FC, CBR155/622 signals, and for the low rate signals, provides low rate Optical channel Data Units x (ODUx) which are adapted to low rate signals mapping and multiplexing into an OPUk, e.g., ODU0, ODU155 (called optical channel data units 155), ODU622 (called optical channel data units 622), etc., so as to achieve end-to-end performance monitoring, maintenance and management, improve bandwidth utilization of an OTN and carry out direct uplink and downlink of low rate signals including GE signals via OTN devices. The ODUx adopt the same format as ODUk while having a rate that matches the low rate signals, which ensures high bandwidth utilization in signal transmission. By mapping and multiplexing of Optical channel Data Tributary Unit (ODTU) and Optical channel Data Tributary Unit Group (ODTUG), multiple ODUx are multiplexed into an OPUK/ODUk by time division multiplexing, and the payload area of the OPUk/ODUk is divided into time slots in a byte interleaving mode according to corresponding rate. The ODUx to be carried and the justification overhead thereof are mapped into corresponding time slots. The justification overhead of the ODUx corresponding to different time slots are carried in the justification overhead area of the OPUk/ODUk according to an MFAS indication, and the ODUx carried by different time slots and the types of the ODUx are identified in a PSI. When the ODUx of different signals or different rates are carried in the same OPUk/ODUk by means of hybrid multiplexing, appropriate number of time slots is assigned to each ODUx, and each ODUx identified by the PSI is filled into the time slots at interval. Through direct multiplexing or hybrid multiplexing, ODUx of multiple different types of low rate signals are multiplexed in a simple and flexible way into OPUk/ODUk of different levels, therefore the bandwidth resources are fully utilized in the transmission and the transparent uplink and downlink transmission and end-to-end management of low rate signals are thus achieved.

For example, in accordance with an embodiment of the present invention, an optical channel data unit of 1 Gbps (ODU0) is provided for low rate signals of 1 Gbps including GE and FC signals, the payload area of ODU0 is OPU0, i.e., optical channel payload unit of 1 Gbps.

FIG. 2 shows the frame format of ODU0 in accordance with an embodiment of the present invention. Every square in the drawing indicates a byte in corresponding location, the $2^{nd}$-$4^{th}$ rows of the first 14 columns are the data management overhead (ODU0 OH) of the ODU0, the $15^{th}$ and $16^{th}$ columns are payload management overhead (OPU0 OH), and the 3808 columns starting from the $17^{th}$ column are payload (OPU0), and the end is the FEC. In accordance with the embodiment of the present invention, each byte of ODU0 OH is the same as that of the ODU OH provided by the digital wrapper technology, thus there is an overhead for end-to-end management of GE signals to implement end-to-end performance management of signals including GE signals. As specified in ITU-T G.709 recommendation, the first rows of the $1^{st}$-$7^{th}$ columns include FAS bytes, and the first row of the $7^{th}$ column includes an MFAS byte for indicating the frame number corresponding to OH bytes in a multi-frame carrying mode. The OPU0 OH includes a PSI byte on the $15^{th}$ column of the $4^{th}$ row, and there are 255 multiplex bytes corresponding respectively to the value of MFAS ranging from 0 to 255, including PT byte and reserved bytes.

An ODU0 is provided based on ITU-T G.709 recommendation, therefore the structure of the ODU0 complies with the recommendation and is similar to an ODUk. The major difference between the ODU0 and the ODUk is that the rate of the ODU0 meets the demand of low rate signals. In accordance with an embodiment of the present invention, the ODU0 offers a bit rate of 1244160 Kbps±20 ppm and a capacity of 4×3824 bytes, which is half of the rate of STM-16, i.e., the payload area rate of OPU1 provided in the ITU-T G.709 recommendation; the size of the OPU0 payload area of an ODU0, is 4×3810 byte; the payload in an OPU0 includes 4×3808 bytes, and corresponding bit rate shall be (3808/3824)×(1244160±20 ppm)=(238/239)×(1244160±20 ppm)=1238954.31 Kbps±20 ppm In accordance with an embodiment of the present invention, low rate GE or FC signals are adapted to the payload area in an OPU0 through a GFP, so the positive/negative justification bytes of the OPU0 may not be used. GE or FC signals are at the rate of 1 Gbps after the 8B/10B decoding of line, and in accordance with GFP-T mapping, the transmission bandwidth of GFP is given by 1 Gbps×(65/64)×(67/65)×(N×67+4+4+(4+60))/N×67

65/64 indicates the coding efficiency of GFP mapping of 64B into 65B; 67/65 indicates the efficiency of mapping of 64B/65B into super block; the rest includes 4 bytes of payload indication and cyclic redundancy check, 4 bytes of payload check sum and 4-64 bytes of payload head. A typical value of N is 95, and when N=95, the transmission bit rate after GFP-T adaptation is 1.0587 Gbps.

GE signals has an inherent frequency deviation of ±100 ppm, therefore the rate of the payload area of an ODU0/OPU0 is greater than the signal rate and hence enough capacity can be offered to transmit GE or FC signals at a rate adapted by GFP-T, including information frames and idle frames. According to the same theory, GE or FC signals at a rate adapted by GFP-F can also be transmitted. And if necessary, the management frames of GFP may be transmitted. Separate GFP transmission, management and maintenance of low rate signals are thus guaranteed. When the payload area of ODU0/OPU0 is filled through GFP mapping, a number of idle frames shall be inserted in accordance with GFP mapping so that the total rate of the GPF signals and the idle frames equals the rate of OPU0 payload area. The method for inserting idle frames can be found in the ITU-T G.709 recommendation.

After mapping the low rate signals into ODU0 to obtain ODU0 wrapped signals, multiple frames of ODU0 shall be multiplexed into a single OPUk/ODUk to form an optical channel transmission unit OTUk so as to utilize the transmission bandwidth furthest and raise the utilization of network resources.

In accordance with an embodiment of the present invention, multiple ODU0 are multiplexed into an OPUk in a TDM mode so that the total rate of multiple ODU0 equals the rate of single OPUk. In the multiplexing of the ODU0 into an OPUk, the ODU0 are mapped into ODTU from 0 to k, i.e., ODTU0-k, e.g., ODTU0-1 or ODTU0-2; and then the ODTU0-k are multiplexed in an asynchronous mode into an ODTUG0-k, e.g., ODTUG0-1 or ODTUG0-2.

In accordance with an embodiment of the present invention, 2 ODU0s are multiplexed in an asynchronous mode through ODTU0-1 and ODTUG0-1 into an OPU1/ODU1, from which we can see that the total rate of the 2 ODU0 accords with the rate of a single OPU1; in another embodiment of the present invention, 8 ODU0s are multiplexed in asynchronous mode through ODTU0-2 and ODTUG0-2 into an OPU2/ODU2, from which we can see that the total rate of the 8 ODU0 accords with the rate of the single OPU2. It can be understood by those skilled in the art that, as long as the rate of the carrier is greater than the total rate of the signals to be carried, multiple ODUns can be multiplexed according to the same method into a single ODUm through ODTUn-m and ODTUGn-m, in which the total rate of the multiple ODUn is less than or equals to the payload rate of the single ODUm while the substance and scope of the present invention are not affected.

The procedure in which multiple ODU0 are multiplexed into a single ODUk through ODTU0-k and ODTUG0-k are explained in detail herein with reference to accompanying FIG. 3.

Firstly, every ODU0 extended with a frame alignment signal generates Justification Overhead (JOH) used for adjusting the rate in a multiplexing procedure so as to achieve accurate rate adaptation from 0 to k. Therefore each ODU0 with ODU0-k JOH forms an ODTU0-k.

Multiple ODTU0-k obtained from multiple ODU0 due to the JOH thereof form an ODTUG0-k, and the ODTUG0-k is multiplexed into an OPUk in a TDM mode. The JOH bytes are multiplexed into OPU1 OH in a frame interleaving mode, and the ODU0 are multiplexed into the Time Slots (TS) of the OPUk in a byte interleaving mode. When 2 ODU0 are multiplexed into 1 OPU1, the OPU1 shall be divided into 2 time slot channels based on time slots to carry the 2 ODU0 respectively; and when 8 ODU0 are multiplexed into 1 OPU2, the OPU2 shall be divided into 8 time slot channels based on time slots to carry the 8 ODU0 respectively.

The payload area of the OPUk is divided into a number of channels based on time slots according to the proportion between the rate of the ODU0 and the rate of the OPUk, so that the rate of each channel is enough to carry an ODU0. The time slots are aligned in a byte interleaving mode, e.g., the column 1 shall be allocated to Channel 1, column N shall be allocated to Channel N, etc., and when column N is allocated to Channel N, Column N+1 shall be allocated to the Channel 1, etc., until the payload area of the OPUk is allocated to multiple channels completely. For example, when 2 ODU0 are multiplexed into 1 OPU1, the odd columns of the OPU1 payload area are allocated to Channel 1 and the even columns are allocated to Channel 2, the length of each channel is 4×3808/2☐4×1904 bytes; when 8 ODU0 are multiplexed into 1 OPU2, one out of every 8 columns of the OPU2 payload area is allocated to a channel and the length of each channel is 4×3808/8☐4×476 byte.

Because one channel in one OPUk frame does not have enough bytes to carry an ODU0 frame, multi-frame multiplexing shall be adopted and one channel in a series of sequential frames shall be used for carrying an ODU0 frame. Multi-frame multiplexing is implemented according to the indication of bit of the MFAS, e.g., when 2 ODU0 are multiplexed into 1 OPU1, the last bit of MFAS (MFAS 7) is adopted to indicate the two sequential multiplex frames, Multiple Frame 0 and Multiplex Frame 1, in which the total bytes of a same channel in the two multiplex frames equal the total bytes of an ODU0 frame, i.e., 4×1904×2=4×3804; when 8 ODU0 are multiplexed into 1 OPU2, the last 3 bits of the MFAS (MFAS 5/6/7) are adopted to indicate the 8 sequential multiplex frames, Multiplex Frames 0-7, in which the total bytes of a same channel in the 8 multiplex frames equal the total bytes of an ODU0 frame, i.e., 4×476×8=4×3804.

The allocation and carrying of ODU0-k JOH is also performed in a multi-frame multiplexing mode, in which the ODU0-k JOH corresponding to multiple ODU0 respectively are allocated to the OH area of every multiplex frame according to the MFAS. For example, when 2 ODU0s are multiplexed into 1 OPU1, the values of MFAS 7 will be 0 and 1 respectively, and the OH areas of the multiplex frames carry the first ODU0-1 JOH and the second the ODU0-1 JOH; when 8 ODU0s are multiplexed into 1 OPU2, the values of MFAS 5/6/7 will be 000, 001, ... 111 respectively, and the OH areas of the multiplex frames carry the first ODU0-1 JOH, the second the ODU0-1 JOH, ... the eighth ODU0-1 JOH.

Figure 4:
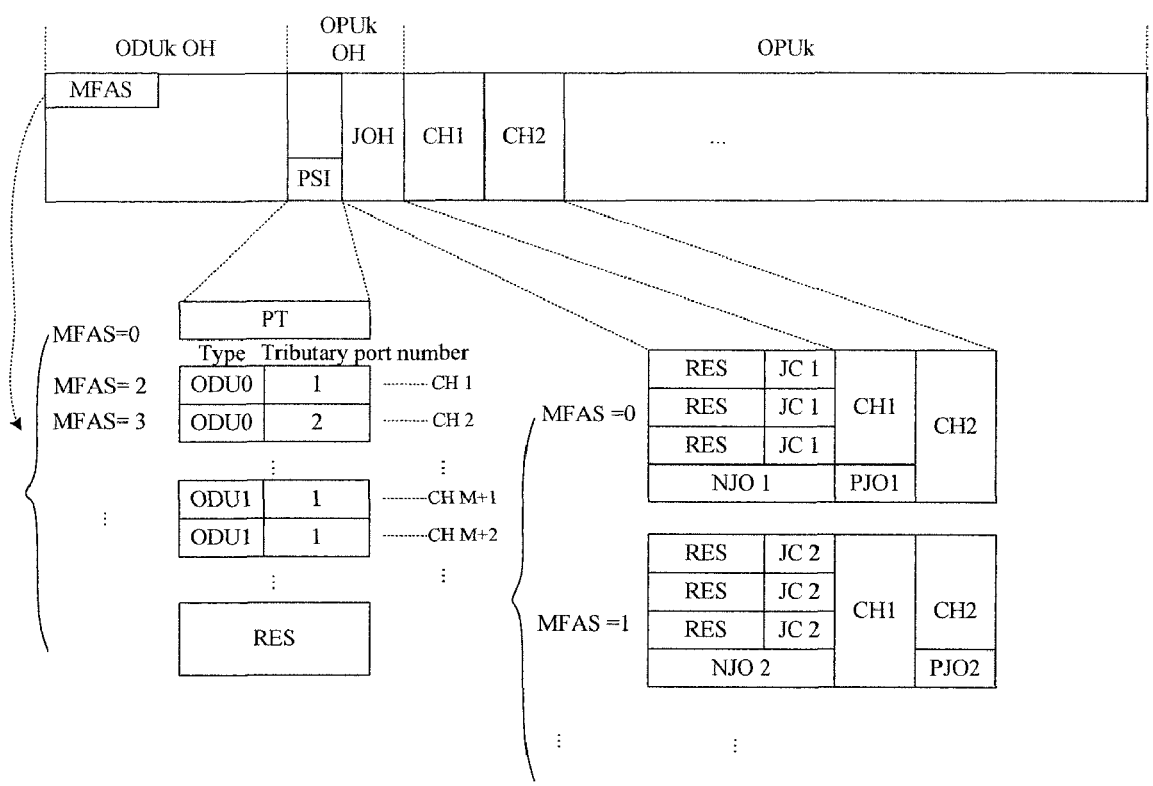
FIG. 4 is a schematic diagram illustrating the allocation of justification overhead bytes in different multiplex frames in accordance with an embodiment of the present invention.

FIG. 4 is a schematic diagram illustrating the allocation of justification overhead bytes in different multiplex frames in accordance with an embodiment of the present invention. The ODU0-k JOH of each ODU0 includes: Negative Justification Opportunity (NJO) byte and Justification Control (JC) byte. The rate of ODU0 frames is adapted to the rate of an OPUk by using the combination of the NJO and the JC. In accordance with the embodiment of the present invention, the NJO and the JC of the ODU0-k JOH are located in the 4 bytes in the $16^{th}$ column of the OPU1 OH. Positive Justification Opportunity (PJO) byte is located in the $4^{th}$ byte of the $1^{st}$ column of the ODU0; while the ODU0 is allocated to a time slot channel in the payload area of the OPUk, the PJO is allocated to the $4^{th}$ byte of the $1^{st}$ column of the time slot channel, and further to the $4^{th}$ byte of the $1^{st}$ time slot of corresponding channel in corresponding OPUk frame, as indicated by the MFAS.

For example, when 2 ODU0s are multiplexed into 1 OPU1, where the value of MFAS 7 is 0, the JC in the first ODU0-1 JOH occupies the last two bits of the $2^{nd}$, $3^{rd}$ and $4^{th}$ bytes in the $16^{th}$ column of the OPU1 overhead area while the first 6 reserved bits are reserved for extension, and NJO occupies the 4th byte in the 16th column and PJO occupies the $4^{th}$ byte in the first time slot of Channel 1, i.e., the $4^{th}$ byte in the $17^{th}$ column of the OPU1 payload area; where the value MFAS 7 is 1, the JC in the second ODU0-1 JOH occupies the last two bits of the $2^{nd}$, $3^{rd}$, $4^{th}$ bytes in the $16^{th}$ column of the OPU1 overhead area while the first 6 reserved bits are reserved for extension, NJO occupies the $4^{th}$ byte in the $16^{th}$ column, and PJO occupies the $4^{th}$ byte in the first time slot of Channel 2, i.e., the $4^{th}$ byte in the $18^{th}$ column of the OPU1 payload area. Similarly, when 8 ODU0s are multiplexed into 1 OPU2, where the values of MFAS 5/6/7 are 000, 001, . . . , 111 respectively, the $16^{th}$ column of the OPU2 overhead area includes the JC and NJO bytes of the first ODU0 to the eighth ODU0, and the PJO bytes of the first ODU0 to the eighth ODU0 are located in the $4^{th}$ bytes of the $17^{th}$-$24^{th}$ columns of the OPU2 payload area.

Furthermore, when multiple ODU0s are multiplexed into one OPUk through multi-frame multiplexing, a PSI byte is also needed in the OPUk OH area to indicate other information related to the multiplexing process, e.g., the corresponding relation between time slot channels and an ODTU0-k, frame type, etc. As described in the fore-going description, the PSI includes 256 bytes corresponding to multiplex frames in accordance with the value of the MFAS which ranges from 0 to 255. According to ITU-T G.709 recommendation, the first byte of the 256 bytes distributed in multi-frames is PT and the rest 255 bytes are reserved bytes. In accordance with an embodiment of the present invention, multiple sequential PSI bytes of the multi-frames starting from PSI byte of the $2^{nd}$ multi-frame indicate respectively the information of the ODTU0-k carried by corresponding time slot channels, two highest bits in a PSI byte indicate that the payload to be carried is ODU0 frame, lower bits of number corresponding to ODU0 frames indicate the tributary port number, i.e., the sequence number of the ODTU to be carried, and the corresponding relation between time slot channels and the ODTU0-k to be carried is thus established.

For example, when 2 ODU0 are multiplexed into 1 OPU1, the PSI bytes of the $3^{rd}$ and the $4^{th}$ multi-frames (with the MFAS values of 2 and 3 respectively) indicate the information of time slot Channel 1 and Channel 2, two highest bits (PSI 6/7) indicate that the payload type is ODU0, and the tributary port number in the lower bit (PSI 0) corresponds to the $1^{st}$ or $2^{nd}$ ODU0 frame. When 8 ODU0 are multiplexed into 1 OPU2, the PSI bytes of the $3^{rd}$ to the $10^{th}$ multi-frames (with the MFAS values of 2 to 9 respectively) indicate the information in the time slot channels from Channel 1 to Channel 8, two highest bits (PSI 6/7) indicate that the payload type is ODU0, and the tributary port number in the lowest bits (PSI 0/1/2) correspond to the $1^{st}$, or $2^{nd}$, . . . , or $8^{th}$ ODU0 frame. The rest bytes of the PSI in the OPUk OH are reserved bytes usually set to value 0.

The mechanism of indicating the carrying of time slot channels by means of PSI bytes of multi-frames is convenient to implement a hybrid multiplexing, that is, the same payload frame may be carried by multiple time slot channels, which is necessary for an OPUk to carry low rate signals frames of different rates, as described in detail hereinafter.

Asynchronous mapping induces a frequency difference. Because OPU1 has an inherent frequency difference of 20 ppm, and the maximum bit rate tolerance between OPU1 and ODU0 is −65 to +65 ppm, the maximum frequency difference of ODU0 tolerated in the asynchronous mapping from ODU0 to ODTU01 is −45 to +45 ppm, hence 20 ppm of frequency difference for ODU0 signals is tolerable in the mapping in accordance with the embodiment of the present invention.

Since OPUk signals are created from a locally generated clock, and are independent of the carried client signals, the justification bytes described in the fore-going description are needed for control in the asynchronous mapping of ODU0 into ODUk/OPUk. In accordance with an embodiment of the present invention, an extended ODU0 signal is adapted to the locally generated ODU1 clock with a positive/negative/zero justification scheme; the asynchronous mapping process generates JC, NJO and PJO in accordance with ITU-T G.709; the de-mapping process interprets the JC, NJO and PJO in accordance with ITU-T G.709 while using a two out of three policy to make a decision in the de-mapping process; when the NJO and PJO are used as justification bytes and the value contained in the NJO and the PJO received by the receiver is all-0β, the receiver is required to ignore the bytes.

In accordance with an embodiment of the present invention, when a signal failure occurs to an incoming ODU0 client signal, the incoming ODU0 client signal shall contain an ODU0 Alarm Indication Signal (ODU0-AIS) which is mapped into an ODTU01; and the de-mapping of ODU0 from ODTU01 is that the ODU0 signal is retrieved from OPU1 under the control of the JOH (JC, NJO and PJO). When a signal failure occurs to an ODU1/OPU1 signal, for example, in the case of an ODU1-AIS condition, the ODU0-AIS will also be obtained by de-mapping.

In an embodiment of the present invention, there are fixed stuff bytes in ODTU0-2 to facilitate the rate adaptation between an ODU0 and an OPU2, e.g., the $119^{th}$ and the $357^{th}$ columns are fixed stuff bytes, the values of which are usually set to all-0s; fixed stuff bytes are inserted once per 8 OPU2 frames and negative/positive justification action is also performed, including inserting at least a positive justification byte; the locations of justification bytes correspond to the local MAFS as described in the fore-going description. Hence a byte of the ODU0 signal shall be mapped into an information byte of the ODTU02.

In accordance with an embodiment of the present invention, ODU0 are mapped into an OPU1 through ODTU0-1, then OPU1 are mapped into an OPU2 through ODTU1-2, therefore an ODTU1-2 is mapped into 2 OPU2 time slots; the length of each of the time slot channels is 3080/4 columns×4 rows, i.e., each of the ODTU1-2 frames is of a structure of 3808/4 columns×4 rows×2 channels×4 frames. Either of the two channels can be used for carrying an ODTU1-2, e.g., OPU2 TSa or OPU2 TSb while 0<a and b<=B, i.e., either 2 of the 8 time slot channels carry an ODTU1-2 which is inserted every other column into the OPU2 TSa and OPU2 TSb in the mapping process. It should be noted that the PSI byte in the OPU2 OH has to identify the tributary port number of ODTU1-2 carried by the channels so that the receiver may parse the received signals and re-organize the parsed signals to obtain ODTU1-2. FIG. 3 also shows the mapping of an ODU1 into ODU2 in accordance with an embodiment of the present invention.

In accordance with an embodiment of the present invention, ODU0 are mapped into an ODU3/OPU3 with the same method. According to the ratio between the rate of the ODU0 and the rate of the ODU3/OPU3, an OPU3 may carry 32 ODU0, thus the payload area of the OPU3 is divided into 32 time slot channels and an ODTU0-3 is of a structure of 4 rows×3808/32 columns×32 frames, which is just enough to carry the ODU0 plus the ODTU0-3 JOH. Similarly, the location of the ODTU0-3 JOH lies on an MFAS and the time slot channel in which the ODTU03 is multiplexed into OPU3. Multiple fixed stuff bytes are inserted into the ODTU0-3, and hence a byte of the ODU0 signal is mapped into an information byte of the ODTU0-3 once per 32 OPU2 frames.

The MAN also carries a great quantity of low rate TDM signals of CBR155/CBR622, and the asynchronous multiplexing of multiple CBR155/CBR622 into an OPUk, especially into OPU2 and OPU3, should be achieved to transmit signals over an OTN. Such mapping process is explained with an embodiment of the present invention hereafter.

Optical channel data units ODU155 and ODU622 of corresponding rates are provided, the rate of which is suitable for carrying CBR155 and CBR622. For example, the ODU622 is at the same level with STM-4 and has a rate at (239/238)×STM-4 and a format identical with the format of ODU0; the ODU155 is at the same level with STM-1 and has a rate at (239/238)×STM-1 and a format identical with the format of ODU0, the rate of 4 ODU622 equals the rate of an ODU1.

The low rate CBR signals to be multiplexed are mapped into the ODU signals at the same level as the low rate CBR signals, so as to obtain the OPU payload, OPU justification overhead and ODU overhead corresponding to each ODU signal.

A low rate ODU signal extended with a frame alignment signal is asynchronously mapped into ODTU155-k/ODTU622-k for carrying low rate ODU by means of JOH generated at the same time.

An OPUk is divided into time slots, and the number of the time slots equals the maximum number of optical channel data tributary units that can be transmitted by the OPUk, that is, the rate of each time slot is as low as possible while fulfilling the requirement of transmission of a optical channel data tributary unit, e.g., an OPU2 is divided into 16 time slots corresponding to 16 ODU622, every tributary time slot occupies 6.25% of the OPU2 payload area and is thus of a structure of 238 columns×4 rows, and the 16 OPU2 time slots are byte interleaved in the OPU2 payload area.

Each ODTU that carries each channel of low rate ODU signal is mapped into a channel of time slot of the OPUk, and ODTU JOH is mapped into OPUk OH assigned to corresponding time slot, e.g., an ODTU that carries a channel of ODU622 signal is mapped into a channel of time slot of OPU2 or OPU3, and ODTU JOH is mapped into the OPUk OH assigned to corresponding time slot.

Corresponding OH bytes are filled, e.g., information on the signals carried by the time slot channels is filled in PSI bytes in multi-frames, and hence the multiplexing of ODU622/ODU155 into an OPUk is achieved.

In accordance with an embodiment of the present invention, when the number of the time slot channels carrying low rate ODU in the OPU payload area is non-integer in some special occasions, complex multi-frame format shall be adopted to map signals into time slots and to fill the mapping information into an OH area.

As described in the fore-going description, the asynchronous multiplexing in an embodiment of the present invention features the multiplexing of signals of different rates into ODUk/OPUk, which greatly facilitates transmitting signals of different rate levels over communication networks. The hybrid multiplexing of signals of different rate levels into an optical transport channel is explained hereafter with reference to an embodiment of the present invention.

Provided M channel of ODU0 and N channel of ODU1 are hybrid multiplexed together into an ODU2 in accordance with the embodiment of the present invention, as shown in FIG. 3, the process shall include the steps described hereafter.

An ODU0 extended with a frame alignment signal is asynchronously mapped into an ODTU0-2 by using JOH; an ODU1 signal extended with a frame alignment signal is asynchronously mapped into the ODTU1-2 by using JOH.

The OPU2 is divided into multiple time slots, e.g., 8 time slots, since the rate of ODTU1-2 is twice as much as the rate of ODTU0-2, when a time slot is just enough to carry signals of minimum rate level, ODU0, it needs 2 time slots to carry an ODTU1-2, wherein 8=2N+M and 0<N<4. In this way N ODTU1-2 and M=8−2N ODTU0-2 can be multiplexed into an ODTUG2 in a TMD mode and the ODTUG2 can be further mapped into OPU2.

Each of the ODTU0-2 and ODTU1-2 is mapped into respective time slots in the OPU2, 1 time slot is assigned to an ODTU0-2 and 2 time slots are assigned to an ODTU1-2, and thereby the M ODU0 and N ODU1 are mapped into the OPU2; furthermore, ODTU0-2 JOH and ODTU1-2 JOH are mapped into OPU2 OH assigned to corresponding time slots respectively, and overhead are filled in the same way as described in the fore-going description.

PSI bytes in multiplex frames of corresponding time slots are filled with the information on the type and tributary port number of the signals carried by the time slots, so that the corresponding relationship between each time slot and the ODTU carried therein is identified.

In accordance with an embodiment of the present invention, multiple low rate CBR155/CBR622 and GE signals are hybrid multiplexed into a higher order OPUk, i.e., M ODU155 /622 and N ODU0 are multiplexed into an OPUk, including the steps described hereafter.

Low rate ODUs corresponding to different low rate signals respectively are provided, and the rates of the ODUs are just enough to carry the low rate signals.

GE signals are received, adapted to the payload rate of OPU0 through a GFP protocol, and mapped into the OPU0; ODU0 OH used for end-to-end management is also generated to form ODU0. CBR signals are received and mapped into OPU155/622; ODU155/622 OH is also generated to form ODU155/622.

The ODU0 or the ODU155/622 extended with a frame alignment signal and are asynchronously mapped into ODTU0-k or ODTU155/622-k by using JOH; corresponding OH bytes shall also be generated and aligned, and an ODTU frame structure shall be configured.

A higher order OPUk is divided into time slots according to the tributary rate, and the number of the time slots equals the maximum number of optical channel data tributary units of minimum rate; for example, when GE and CBR622 signals are multiplexed into an OPU2 together, the time slots of the OPU2 are divided in accordance with CBR622 signals, i.e., the OPU2 is divided into 16 time slots corresponding to 16 ODU622 at the most, each tributary time slots occupies 6.25% of the OPU2 payload area and is of a structure of 238 columns×4 rows; in such case 2 time slots shall be assigned to an ODU0 since the rate of ODU0 is twice as much as the rate of ODU622. In this way N GE and M CBR622 signals are hybrid multiplexed into an OPU2, wherein M+2N=16 and 0<N<8.

JOH of each ODTU is allocated in the OPU OH area of multi-frame, e.g., the JOH consisting of JC and NJO for 16 tributary time slots occupies the first 4 rows in the 16$^{th}$ column of the OPU2 OH area; ODTU JOH is assigned to every tributary once per 16 frames, which is indicated by an MFAS distributed in 16 frames by using 4 lowest bits of the MFAS.

Each ODTU carrying the ODU is mapped into time slot channels of corresponding number in the OPUk respectively, e.g., an ODTU0-2 is mapped into 2 time slots and an ODTU622-2 is mapped into 1 time slot; and the ODTU JOH is filled in OPUk OH of each multi-frame according to original allocation. For example, when 14 ODU622 and 1 ODU0 are multiplexed into an OPU2, since an ODTU that carries an ODU622 signal is mapped into 1 time slot of the OPU2, 14 ODU622 need 14 time slots; and the ODTU0-2 that carries the ODU0 is mapped into the rest 2 time slots of the OPU2; the JOH of the ODTU622-2/ODTU0-2 are mapped into the OPUk OH assigned to corresponding time slots.

PSI bytes of multi-frame in the OPU OH are filled to indicate the type and the tributary port number of the ODU carried by the time slots.

It can be understood by those skilled in the art that, as long as the rate of time slot channels are enough to carry signals, the combination of low rate signals of any quantity and type can be mapped and multiplexed into a higher order ODU/OPU; the multiplexing is performed under corresponding multiplex control policy, and thereby transparent transmission, end-to-end management, and direct uplink and downlink transmission can be achieved without affecting the substance and protection scope of the present invention.

Figure 5:
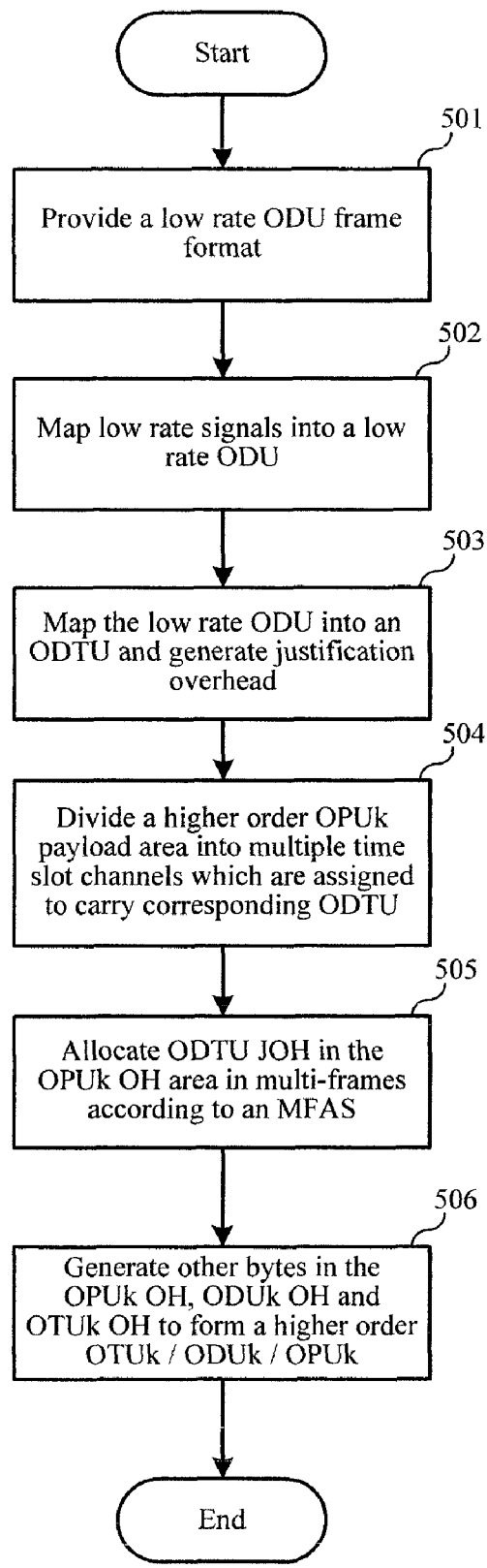
FIG. 5 is a schematic flow chart of the low rate signals transmission over the OTN in accordance with an embodiment of the present invention.

To sum up, the flow chart of transmitting low rate signals over the OTN is illustrated as shown in FIG. 5 and described hereinafter in accordance with an embodiment of the present invention.

Step 501: provide a low rate ODU corresponding to a variety of low rate signals; the payload area rate of the ODU is enough to transmit the low rate signals; end-to-end performance monitoring, management and maintenance of the low rate signals are implemented by means of the configuration of overhead area of ODU, so as to ensure OAM&P performance. For example, provide ODU0 corresponding to GE or FC signals, and provide ODU155/ODU622 corresponding to CBR155/622 signals.

Step 502: receive the low rate signals and map the low rate signals into the payload areas of corresponding low rate ODU, generate an ODU OH area, and form low rate ODU. For GE signals, GFP mapping is required. The definition of ODU OH area can be identical with the definition of ODUk OH.

Step 503: map the low rate ODU signals into corresponding ODTU tributary signals and generate JOH. The ODTU are tributary signals used for multiplexing low rate ODU into a higher order ODUk/OPUk. The JOH are used for adjusting the ODU rate so that the ODU is adapted to the payload area of an ODUk/OPUk. The low rate ODU bytes need to be mapped into ODTU information bytes when there are fixed stuff bytes.

Step 504: divide the payload area of the higher order OPUk into multiple time slot channels, and map the ODTU into at least one time slot channel respectively.

The higher order OPUk is divided according to the size of the minimum rate ODTU tributary signals that can be transmitted, and the number of the time slot channels equals the maximum number of the minimum rate optical channel data tributary units that can be transmitted; then the time slot channels are assigned based on the rates of different optical channel data tributary units so that every low rate ODU can be carried by corresponding time slot channels and the requirement of transmission rate can be met; the multi-frame length crossed by every tributary signal is determined by a rate ratio. For example, when ODU0 and ODU622 are hybrid transmitted in OPU2, minimum rate tributary signals are ODTU622-2, and an OPU2 can carry 16 ODTU622-2 at the most, therefore the payload area of the OPU2 is divided into 16 time slot channels and every ODTU622-2 is carried by a time slot channel across 16 sequential frames while every ODTU0-2 is carried by 2 time slot channels across 8 sequential frames. In this step the PJO is further filled in corresponding time slot channel of the ODTU.

Step 505: the JOH of different ODTU are allocated in the OPUk OH area in multi-frames, and according to an MFAS, low rate ODTU JOH corresponding to different time slot channels are allocated in the OPUk OH area of corresponding multi-frame.

Step 506: generate other bytes in the OPUk OH, ODUk OH, OTUk OH to form a complete OTUk/ODUk/OPUk for transmission over the OTN. For example, generate PSI bytes in multi-frames to indicate the types and tributary port numbers of low rate ODU signals carried by corresponding time slot channels.

At the receiver, the higher order optical channel data unit is parsed to obtain the low rate optical channel tributary units, which are further parsed to obtain the low rate optical channel data units and to retrieve the low rate signals.

The foregoing is only preferred embodiments of the present invention and is not for use in limiting this invention, any modification, equivalent replacement or improvement made in accordance with the spirit and principles of the present invention is included in the protection scope of the present invention.

What is claimed is:

1. A method for transmitting low rate signals over an optical transport network, comprising:
    adapting, by an OTN device, low rate signals into low rate optical channel data units of the same rate level with the low rate signals;
    asynchronously mapping, by the OTN device, each of the low rate optical channel data units into a low rate optical channel data tributary unit respectively, and generating justification overhead used for rate adaptation for each of the low rate optical channel data units;
    forming, by the OTN device, a higher order optical channel data unit with at least one low rate optical channel data tributary unit and justification overhead corresponding to the at least one low rate optical channel data tributary unit.

2. The method of claim 1, wherein the forming the higher order optical channel data unit comprises:
    dividing the payload area of a higher order optical channel payload unit into at least one time slot channel, and mapping the at least one low rate optical channel data tributary unit into the at least one time slot channel; and
    mapping the justification overhead of each of the at least one low rate optical channel data tributary unit respectively into the overhead area of the higher order optical channel payload unit according to a Multi-Frame Alignment Signal (MFAS).

3. The method of claim 2, wherein the dividing the payload area of the higher order optical channel payload unit into the at least one time slot channel comprises:
    dividing the payload area of the higher order optical channel payload unit according to the size of the minimum low rate optical channel data tributary unit that can be transmitted by the payload area of the higher order optical channel payload unit, wherein the number of the time slot channels equals the maximum number of minimum low rate optical channel data tributary units that can be transmitted by the payload area of the higher order optical channel payload unit.

4. The method of claim 2, further comprising:
    filling justification control bytes and negative justification opportunity bytes of the justification overhead in the overhead area of the higher order optical channel payload unit, wherein the location of the justification overhead corresponds to a present value of the MFAS.

5. The method of claim 2, further comprising:
    filling positive justification opportunity bytes in the time slot channel corresponding to the low rate optical channel data tributary unit.

6. The method of claim 2, further comprising:
    filling a frame alignment signal in the overhead area of the low rate optical channel data unit.

7. The method of claim 2, further comprising:
    filling a Payload Structure Identifier (PSI) in the overhead area of the higher order optical channel payload unit for indicating the type and the tributary port number of the low rate optical channel data tributary unit carried by the time slot channel corresponding to a present MFAS value.

8. The method of claim 2, further comprising:
    filling fixed stuff bytes in the rate optical channel data tributary unit to adjust the rate of the low rate optical channel data unit, and
    mapping each byte in the low rate optical channel data unit into an information byte in the low rate optical channel data tributary unit.

9. The method of claim 2, further comprising:
    filling an alarm indication signal in the low rate optical channel data tributary unit in the case that the low rate signals to be transmitted fail.

10. The method of claim 2, wherein the low rate signals comprises at least one of Gigabyte Ethernet (GE) signals, Fiber Connection (FC) signals, CBR 155M signals, and CBR 622M signals; and
    the higher order optical channel data unit comprises one of an optical channel data unit of level 1, an optical channel data unit of level 2, and an optical channel data unit of level 3.

11. The method of claim 10, wherein when the low rate signals comprise GE or FC signals, corresponding low rate optical channel data unit comprises an optical channel data unit of level 0;
    when the low rate signals include CBR 155M signals, corresponding low rate optical channel data unit comprises an optical channel data unit of type 155; and
    when the low rate signals comprise CBR 622M signals, corresponding low rate optical channel data unit includes an optical channel data unit of type 622.

12. The method of claim 2, wherein the higher order optical channel payload unit comprises one of an optical channel payload unit of level 1, an optical channel payload unit of level 2, and an optical channel payload unit of level 3; and
    the payload area rate of the higher order optical channel payload unit is greater than or equals the double of the rate of the low rate optical channel data tributary unit.

13. The method of claim 1, wherein the low rate signals comprises at least one of Gigabyte Ethernet (GE) signals, Fiber Connection (FC) signals, CBR 155M signals, and CBR 622M signals; and
    the higher order optical channel data unit comprises one of an optical channel data unit of level 1, an optical channel data unit of level 2, and an optical channel data unit of level 3.

14. The method of claim 13, wherein when the low rate signals comprise GE or FC signals, corresponding low rate optical channel data unit comprises an optical channel data unit of level 0;
    when the low rate signals include CBR 155M signals, corresponding low rate optical channel data unit comprises an optical channel data unit of type 155; and
    when the low rate signals comprise CBR 622M signals, corresponding low rate optical channel data unit includes an optical channel data unit of type 622.

15. The method of claim 1, wherein the low rate optical channel data unit comprises a payload area used for carrying the low rate signals, and an overhead area used for monitoring, managing and maintaining the low rate signals.

16. The method of claim 1, further comprising:
parsing the higher order optical channel data unit to obtain the at least one low rate optical channel tributary unit and the corresponding justification overhead;
parsing the at least one low rate optical channel tributary unit to obtain the low rate optical channel data units according to the corresponding justification overhead; and
retrieving the low rate signals from the low rate optical channel data units.

* * * * *